Figure 1:
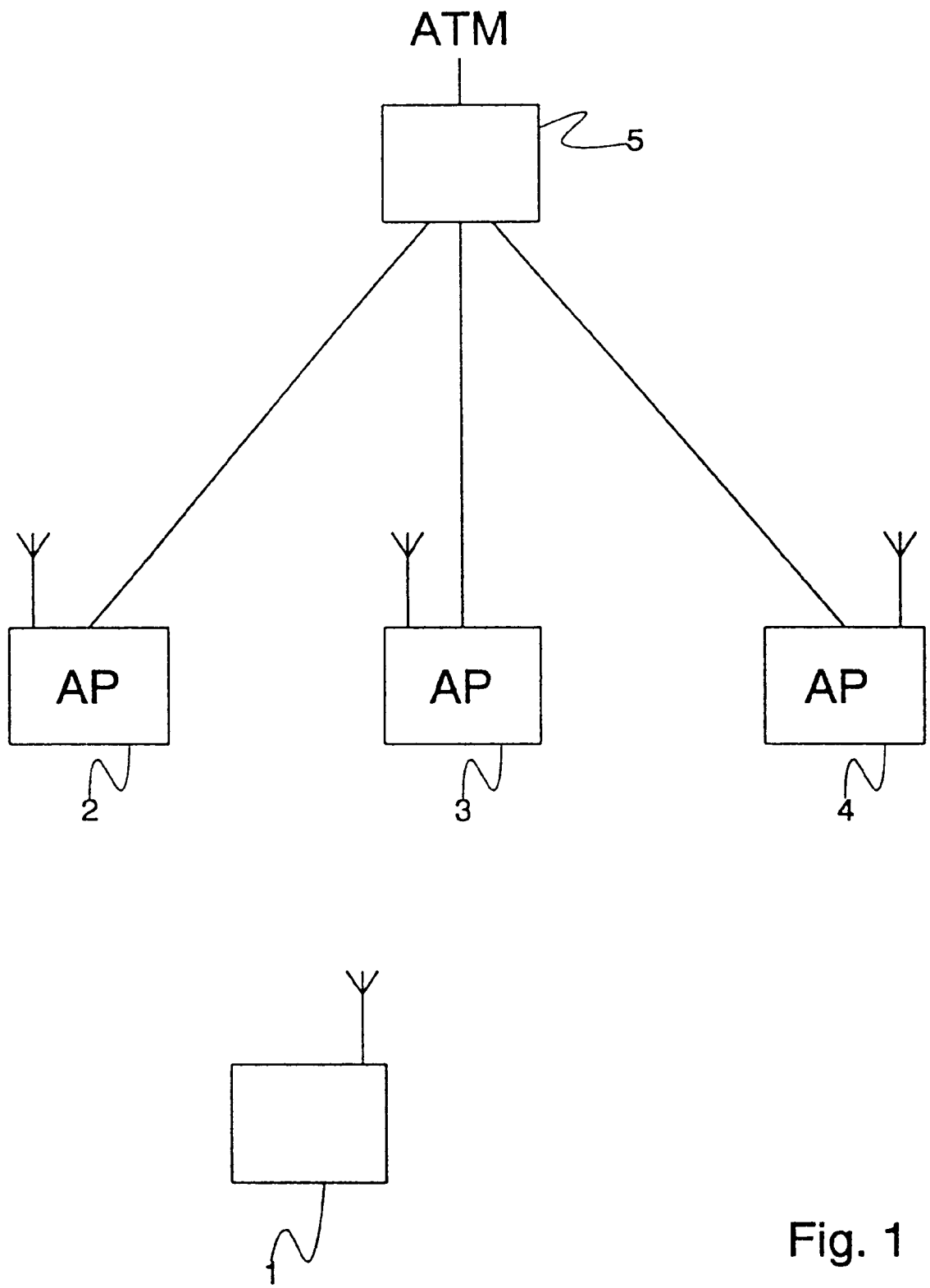

United States Patent

Mitts et al.

[11] Patent Number: 5,912,885
[45] Date of Patent: Jun. 15, 1999

[54] METHOD FOR ESTABLISHING RADIO CONNECTION AS PART OF AN ATM NETWORK

[75] Inventors: Håkan Mitts, Helsinki; Jukka Immonen; Harri Hansen, both of Espoo, all of Finland; Frédéric Bauchot, Saint-Jeannet; Gérard Marmigere, Drap, both of France

[73] Assignee: NOkia Mobile Phones Ltd., Salo, Finland

[21] Appl. No.: 08/802,014

[22] Filed: Feb. 18, 1997

[30] Foreign Application Priority Data

Feb. 22, 1996 [FI] Finland ................................... 960816

[51] Int. Cl.⁶ ................................ H04Q 7/00; H04J 3/02
[52] U.S. Cl. ............................................. 370/331; 370/522
[58] Field of Search ...................... 370/229, 230, 370/231, 235, 236, 331, 332, 333, 389, 395, 396, 400, 506, 338, 401, 397, 522, 524; 455/436

[56] References Cited

U.S. PATENT DOCUMENTS

| | | | |
|---|---|---|---|
| 4,887,265 | 12/1989 | Felix | 370/94.1 |
| 5,189,734 | 2/1993 | Bailey et al. | 455/33.2 |
| 5,345,448 | 9/1994 | Keskitalo | 370/95.3 |
| 5,410,733 | 4/1995 | Niva et al. | 455/33.2 |
| 5,483,668 | 1/1996 | Malkamaki et al. | 455/33.2 |
| 5,487,065 | 1/1996 | Acampora et al. | 370/60.1 |
| 5,524,009 | 6/1996 | Tuutijarvi et al. | 370/95.3 |
| 5,751,773 | 5/1998 | Campana, Jr. | 370/506 |
| 5,787,077 | 7/1998 | Kuehnel et al. | 370/331 |

FOREIGN PATENT DOCUMENTS

0679042 A2  10/1995  European Pat. Off. .

*Primary Examiner*—Chi H. Pham
*Assistant Examiner*—Afsar M. Qureshi
*Attorney, Agent, or Firm*—Perman & Green, LLP

[57] ABSTRACT

In a radio extension of an ATM network, prior to establishing a given connection the switch of a fixed network enquires access points as to what is the resource situation in said access points. After receiving responses the switch decides to which access point the connection is allocated. During handover, the resource enquiry is accomplished as a response to the handover request sent by the mobile terminal, which request is transmitted either when the connection to the old access point still operates or after the connection is closed; in the latter case, the request is retransmitted through the new access point.

13 Claims, 2 Drawing Sheets

METHOD FOR ESTABLISHING RADIO CONNECTION AS PART OF AN ATM NETWORK

The invention relates generally to operations aiming at the mobility of a wireless terminal in a data transmission network, where data is transmitted in packets, i.e. cells. The invention particularly relates to a method for establishing a connection between a terminal device and a base station in a network that guarantees the connection a certain quality of service.

The ATM (Asynchronous Transfer Mode) network is a data transmission system where data is transferred in digital form as 53-byte cells from one terminal to another through switches and rapid transfer connections therebetween. Each cell contains a 48-byte payload and a 5-byte header. In order to save space, the header information of each cell does not include complete address information describing the used data transfer route from the transmitting to the receiving device, but only information of the virtual path and channel where said data transfer connection is being carried. The switches or nodes of the network contain necessary routing information, on the basis whereof said identifiers of virtual path and channel are interpreted as references to the respective node in succession.

It is to be expected that in the future the ATM network, which has so far been based mainly on cable connections, will also serve wireless terminals that are in contact with the network via radio access points. These mobile terminals may move with respect to the access points and their coverage area, in which case the system must be able to perform a handover when necessary. A specific feature of each ATM connection is a contract between the terminal and the network as to the quality of service (QoS) required by the connection. This contract particularly covers the maximum length of the delays allowed in the connection and the capacity needed by the connection, which capacity is measured in units of transfer rate (for instance cells/s). The agreed quality of service for the connection and its upkeep are important factors when making decisions as for the instant of the handover and the new access point to be assigned for a given mobile terminal. Moreover, the partly unpredictable coverage and interference properties of the radio connection cause uncertainty as to how the quality of service should be defined when forming a connection, and how it can be maintained during connection.

FIG. 1 illustrates a simple radio extension of an ATM system, comprising a mobile terminal 1, three access points 2, 3 and 4, and a switch 5 linking connections between the access points and the rest of the network. The establishment of a radio connection becomes actual when data is wished to be transmitted between the mobile terminal 1 and the ATM network via the access point 2. During the connection and even prior to its formation, the mobile terminal can also have information of the existence of the access points 3 and 4 as recorded in a certain register of alternative access points. The mobile terminal 1 can also have several simultaneous ATM connections, and the cell streams connected to these can be independent of each other.

If the quality of service determined for a given ATM connection is very high and the system cannot maintain it, because there is interference in the radio connection, the user of the mobile terminal 1 does not get the desired application to function properly and finds the situation frustrating and a proof of the unreliability of the system. On the other hand, if immoderately high requirements are set for the reliability of the system before the system is even capable of making contact, the user may find that he does not obtain the desired connection irrespective of repeated efforts. Moreover, it is typical of the ATM system that cells in a given cell stream must not be lost; neither can the cells be doubled nor change their relative order at different stages of the connection, which causes difficult synchronisation demands. The loss of cells or a confusion in their order generally results in that on some higher protocol layer, there is detected an erroneous check sum or another indicator, in which case a given information PDU (Protocol Data Unit) is discarded and required to be retransmitted. This is uneconomical from the point of utilising the network capacity.

Yet another problem is connected to dividing the network capacity between several different users. In addition to the quality of service, a per-connection ATM traffic contract also includes an agreement as to how large a share of the network's capacity a given connection is allowed to use. It is possible that an individual user tries, deliberately or owing to a malfunction, to surpass the agreed capacity limits, which weakens the service received by other users. Both when establishing the connection and in the handover, the amount of resources reserved for said connection should be controlled.

The object of the present invention is to introduce a method for establishing a radio connection in a wireless ATM system, considering a correct definition and maintenance of the quality of service. Another object of the invention is to suggest a method for controlling the data transmission resources reserved by a given radio transmitted connection.

The objects of the invention are achieved by dividing the tasks connected to the definition and maintenance, as well as to a connectionwise traffic contract between a fixed ATM network switch and at least one radio access point which is in data transmission contact thereto, in a fashion to be described below.

In the method of the invention for making a data transmission contact in a data transmission system where a given quality of service is connected to the connection, and which data transmission system comprises a switch, at least one access point and a mobile terminal, and in which method said mobile terminal transmits by radio a request for forming a data transmission connection, said request containing information of the quality of service required by said connection, and said access point receives said request and transfers it to said switch, it is characteristic that as a response to said request, said switch sends at least one access point an enquiry as to whether the access point could support the data transmission connection according to the request, considering said quality of service, as a response to said enquiry the receiving access point sends an answer to said switch, and on the basis of this answer, the switch decides whether the data transmission connection expressed in said request will be allocated to the access point that sent the answer.

Such radio-based extensions of the ATM network that are meant for mobile terminals conform to the above described architecture where there is a switch of a fixed (cable-transmitted) ATM network, and at least one radio access point connected thereto, most probably several access points. According to the research that lead to the present invention, the control operations that define the quality of service of the connections transmitted over the radio extension and make decisions about allowing or preventing connections, can in principle be divided in three ways:

in a centralised fashion, in which case the switch of the fixed ATM network makes all decisions on the basis of daily updated status information sent by the access points, in a decentralised fashion, in which case each access point allows or prevents a given connection by an independent decision, or by dividing the decisions concerning traffic contracts between the switch and the access point or points.

For the sake of brevity, the switch of a fixed ATM network will henceforth be called "switch". In the research that lead to the present invention it was maintained that the best of the above mentioned alternatives is the division of decisions and tasks between the switch and the access points. Accordingly, an uplink connection, i.e. a connection from mobile terminal to network, begins with a connection request of the mobile terminal, including indication of the quality of service desired by the mobile terminal and reaching the switch via some access point. The switch sends a status enquiry to at least one access point, on the basis whereof the access point checks whether its capacity is sufficient to handle said connection. On the basis of the answer or answers sent by the access point or points, the switch assigns the connection to be transmitted for a given access point. The same enquiry procedure is advantageously applied during handover, where the request of the mobile terminal for a handover is transmitted to the switch, which sends a status enquiry to one or several access points. On the basis of the responses of the access points, the switch decides to which access point the pending connection is forwarded.

The radio extension of an ATM network applying the method of the invention is easily modified to include a larger or smaller amount of access points. When the data transmission between the access points and the switch concerning for instance the termination of a cell stream in a given direction is arranged according to the method suggested in the invention, the switch has continuous good possibilities to survey the operation of the whole radio extension. In the amount of signalling between the access points and the switch, there is reached a good compromise between decentralised decision-making (=little signalling) and centralised decision-making (=a lot of signalling), because information of the operational status of the access points is transmitted between them and the switch only when necessary. The switch need not be dependent on radio traffic standards and connection practices applied in the system, because it need not make decisions concerning individual access points, which decisions are affected for example by the different radio interfaces offered by the different access points to the mobile terminals. The method utilises real-time status information of the access points, in which case the system is rapidly adapted to the changing radio connection conditions.

Figure 2:
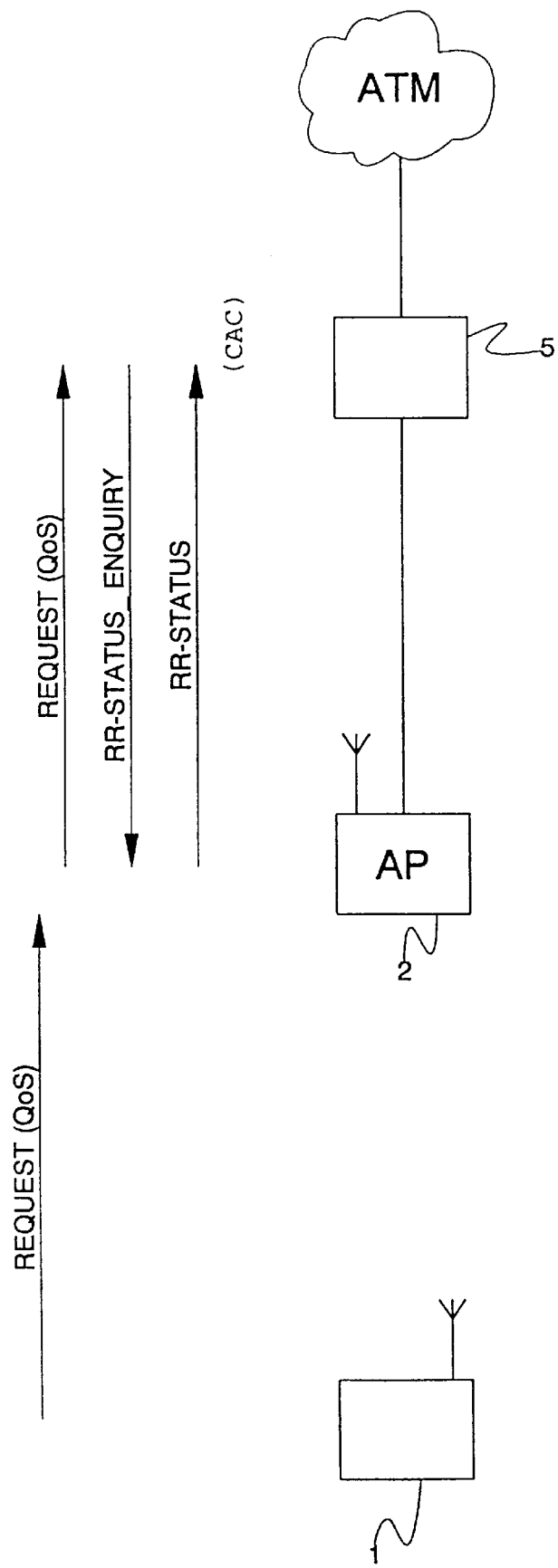

The invention is explained in more detail below, with reference to a few preferred embodiments described by way of example and to the accompanying drawings, wherein FIG. 1 illustrates a prior art radio extension of an ATM network, and FIG. 2 illustrates a radio extension of an ATM network, where the method of the invention is applied.

In the above description of the prior art we referred to FIG. 1; hence, in the following specification of the invention and its preferred embodiments, mainly FIG. 2 will be referred to. Like numbers for like parts are being used in the drawings.

Let us first explain how a connection is established in a radio extension of an ATM network according to FIG. 2, comprising a mobile terminal 1, an access point 2 and a switch 5, which is in cable connection to a fixed ATM network. The mobile terminal 1 sends the access point 2 a request concerning a defined ATM connection, which the access point transmits transparently to the switch 5. The request includes, among others, information of the quality of service required by the mobile terminal. As a response to said request, the switch must make an ATM traffic contract containing, on behalf of the network, commitment to a given quality of service and demands that the mobile terminal follows a given detailed connection traffic descriptor. The ATM traffic contract covers both the share of the radio extension and the connection towards the fixed ATM network. Here it is assumed that the switch first deals with the share of the radio extension.

The switch 5 sends the access point 2 a certain RR-STATUS_ENQUIRY message, below called status enquiry. The same or a similar message can be sent from the switch to several adjacent access points, too. The mobile terminal 1 may also have included in its request for connection a list of all access points that it hears, in which case the switch 5 sends a RR-STATUS_ENQUIRY message to at least part of these access points. This message contains, among others, information of the quality of service the connection requested by the mobile terminal demands. The access point 2 checks the reservations situation of its resources and finds out whether it can handle the connection in question. The access point expresses its possible positive decision by sending the switch 5 a certain RR-STATUS message, to indicate the positive decision and to express how much the transmitting of the connection burdens the desired quality of service. If the quality of service requires for instance that a maximum delay is 100 ms, the access point 2 can inform that if the connection is transmitted through it, there will be a delay of 30 ms owing to the radio path. In order to speed up the following steps of the procedure, the access point 2 also makes a preliminary reservation of certain resources to said connection and attaches the RR-STATUS message an identifier whereby these resources are reserved.

On the basis of the response sent by the access point 2, the switch 5 makes a CAC (Connection Admission Control) decision, which in the operation of an ATM switch belongs to technology known as such and means mainly a decision as to whether the requested connection is accepted to be transmitted, or is declined for example due to inadequate resources. At first the decision concerns the radio extension, but if necessary, the switch can make a CAC decision for transmitting the connection towards the fixed ATM network, too. In this task the feed information utilised by the switch consists of how large a share of the "budget" of the quality of service was already spent in the radio extension (cf. the delay example above). Because cable connections generally are very reliable and quick in comparison to radio connections, it is probable that particularly the radio part is the limiting factor when speaking of the sufficiency of resources, in which case the CAC decision is made mainly on the basis of the status information received from the access point or points.

If the CAC decision is positive concerning both the radio extension and the fixed network, the switch acknowledges the connection and signals the acknowledgement to the mobile terminal by means of known procedures of the ATM system. If there are several access points and the switch has sent a status enquiry to all of them, it must also transmit a command to release the reserved resources to all those access points that sent a positive answer to the status enquiry but are not allocated to transmit the connection. According to an alternative embodiment of the invention, the release command does not always mean a complete release of the resources, but to the access points surrounding the chosen access point there can be sent a command to keep a defined minimum capacity reserved for a possible handover. This embodiment presupposes that the switch has knowledge of the relative locations of the access points, which is useful also when each switch tries to foresee a possible handover by predicting the next access point, to the sphere of influence whereof the mobile terminal will move.

Apart from the situation of resource reservations in the various access points, there are other factors that can affect the CAC decision. For example, the mobile terminal can have different exploit rights to the services of different access points, or a home area price rate known from mobile telephone networks, in which case the connection is most advantageously handled through a particular access point.

The method of the invention can also be applied to handover. When the mobile terminal 1 observes that the connection to the old access point 2 is weakening, it decides to start a handover. The mobile terminal sends a HO_REQUEST message, which is transmitted to the switch 5 by the access point 2. The message contains, among others, a prioritised list of those access points to which the mobile terminal 1 can hand over, i.e. the ones that it hears. As a response to the HO_REQUEST message, the switch 5 sends a status enquiry, i.e. a RR-STATUS_ENQUIRY message to all access points in the list or to part of them in order to find out how the different access points could assume the new connection. Each access point that received the status enquiry checks the situation at hand and makes a preliminary reservation of the required resources as well as sends the switch a RR-STATUS message in order to indicate whether it can handle the connection and what is the identifier of the preliminary reservation. On the basis of the received responses the switch 5 chooses that positively answered access point which has highest priority.

In a forward handover, where the mobile terminal rapidly disappears from the area of coverage of the old access point, it is not possible to follow the above described procedure, but the mobile terminal establishes radio connection with some new access point and sends therethrough to the switch a HO_REQUEST message declaring a handover. The message contains, among others, a prioritised list of those access points that the mobile terminal can hand over to, i.e. those that it hears. As a response to the HO_REQUEST message, the switch sends a status enquiry, i.e. a RR-STATUS_ENQUIRY message, to all access points in the list or to part of them in order to find out how the various access points could handle the new connection. The responses of the access points to this message and the decision made in the switch on the basis thereof are accomplished in the same fashion as above, in the case of the backward handover. Because the mobile terminal has established the contact via a given access point, thus considering it the preferred new access point, it is probable that the switch decides to assign the connection to this particular access point. If the mobile terminal does not transmit the list of prioritised access points but only information of the old access point, the new access point can make direct contact to the old access point and request a forwarding of the downlink cells that were left untransmitted.

When the connection from the mobile terminal 1 via a given access point 2 to the switch 5 has been established, the system must control that the mobile terminal does not surpass the limits of the resources set by the ATM traffic contract. In the method dealt with here, the radio connection is probably the most significant limiting factor, and therefore the method according to the present invention is particularly concentrated in the control of radio resources.

As for the mobile terminals, it can be required that the manufacturers provide the equipment with functions that prevent the surpassing of the negotiated resource limit. This kind of "voluntary" control is generally called "traffic shaping". However, users may deliberately modify the operation of the mobile terminals, wherefore the network must also be prepared to attempts of dishonest use. Control carried out in the network is called UPC (Usage Parameter Control).

In a preferred embodiment of the method of the invention, the access point 2 comprises an algorithm which distributes the capacity of the radio path for the mobile terminals on the basis of requests sent by said terminals and ATM traffic contracts agreed for each connection individually. In the transmission buffer (not illustrated in the drawing) of the mobile terminal 2, there is at each given moment a certain amount of cells according to the VC (Virtual Circuit) to be transmitted via a given access point 2. In a specific reservation message, the mobile terminal informs the access point as to the size of the buffer assigned for this particular connection, whereafter the access point decides how many cells the mobile terminal can transmit at a time. The access point 2 thus creates a transmission schedule per each virtual circuit, which schedule in practice corresponds to the UPC function. If the mobile terminal 1 tries to send more cells than was agreed, the access point does not acknowledge them or, if there is enough vacant capacity, it acknowledges them but forwards them marked with a CLP (Cell Loss Priority) flag, value 1, which means that if problems arise elsewhere in the network due to an excessive number of cells, said cells can be destroyed.

Owing to a method of a preferred embodiment of the invention, in which method the UPC function is performed already at the access point 2, the operation of the switch 5 can be somewhat simplified, because now it does not have to recheck those connections that were already checked by the access point 2. The access point 2 does not have to pay attention to downlink connections directed from the network towards the mobile terminal, because the respective UPC operations were already carried out elsewhere in the network.

The share of the method according to the invention, concerning the procedures of the system in order to maintain an agreed quality of service, is based on two alternative models of operation. It is probable that the reliability of the radio connection, i.e. a faultless transmission of cells with a minimum delay between the access point and the mobile terminal is the most significant factor threatening the upkeep of the quality of service. On the basis of an ATM traffic contract describing a given connection, there can be defined time limits per each cell, on the basis whereof the transmitting radio apparatus can calculate how much time there is left for transmitting a given cell. If the transmission of a given cell has failed (the receiving apparatus has not sent acknowledgement, or has sent a negative acknowledgement), but there is a lot of time left, the cell can be retransmitted, even several times if necessary. If the per-cell transmission deadline draws close, the cell can be retransmitted perhaps only once. In that case it can, however, be marked with error correction codes, on the basis whereof the receiving apparatus can correct minor bit errors.

The first of the two alternative models of operation is to define a constant ratio of retransmission and error correction for the whole duration when a given mobile terminal is in contact with a given access point. This means that in between the access point and the mobile terminal there is defined to what extent there is applied retransmission and to what extent error correction, when a new connection is established or when the connection is forwarded to said access point as a result from a handover. If a given cell is not successfully transmitted before the cellwise deadline expires, the system does not proceed to any correction operations, but the cell is lost. According to another alternative operations model, the ratio between the retransmission and error correction is decided dynamically on the basis of the remaining "time-to-live" of each cell. If the deadline of the cell in question draws very close owing to strict non-delay demands or to several failed retransmissions, the proportion of error correction is increased. Respectively, a cell with a lot of "time-to-live" left, can be retransmitted several times by applying lower error correction, which reduces the need for processing in the transmitting apparatus.

The above described operation models can also be combined, so that the connection first uses a constant default-value ratio between error correction and retransmission. If the time-to-live of a given cell, the average time-to-live of cells, the relative proportion of disappearing cells or some other critical factor does not stay within the limits set for the default value procedure, the transmitting apparatus can shift over to a more flexible dynamic alternative. The Media Access Control (MAC) protocol layer according to the OSI (Open System Interconnection) model used in data transmission must be composed so that said alternatives can be realised. One alternative is to adapt the MAC protocol, so that one slot defined in the protocol can alternatively contain

- a PHY header, a MAC header and an ATM cell with low error correction,
- a PHY header, a shortened MAC header and an ATM cell with high error correction (the shortening of the MAC header restricts the length of the MPDU/slot queue to be supported),
- 3 ATM cells with low error correction (2-n in terms of slots in the slot queue), or
- 2 ATM cells with high error correction (2-n in terms of slots in the slot queue).

In the above specification, the invention is explained with reference to an application in a radio extension of an ATM system only, but the same inventional idea can be applied to all such data transmission systems where the data transmission connection is attached to a given quality of service which demands that resources are reserved in the access point.

We claim:

1. A method for forming a data transmission connection in a data transmission system where the connection is bound to a given quality of service, which data transmission system comprises a switch, at least one access point and a mobile terminal, and in which data transmission system said mobile terminal transmits by radio a request for establishing a data transmission connection, said request containing information of the quality of service required by said data transmission connection, and said access point receives said request and transfers it to said switch, characterised in that as a response to said request, said switch sends to at least one access point an enquiry as to whether said access point can handle the data transmission connection referred to in the request, considering said quality of service, as a response to said enquiry, the access point that received the enquiry sends said switch an answer, and on the basis of said answer, the switch decides whether the data transmission connection referred to in the request will be transmitted via the access point that sent the answer.

2. A method according to claim 1, characterised in that while said data transmission system comprises several access points, said switch sends, as a response to said request, to at least two access points an enquiry as to whether said access points can handle the data transmission connection referred to in said request, when taking said quality of service into account, as a response to said enquiry the at least two access points send a response to said switch, and on the basis of the responses received from the at least two access points, said switch decides through which access point the data transmission connection referred to in said request will be transmitted.

3. A method according to claim 1, characterised in that when said switch has sent to a given access point an enquiry as to whether said access point can handle the data transmission connection referred to in the request, when taking said quality of service into account, as a response to said enquiry said access point informs said switch to what extent the transmission of said data transmission connection would burden said quality of service.

4. A method according to claim 1, characterised in that when said switch has sent a given access point an enquiry whether said access point can transmit the data transmission connection described in the request, when taking said quality of service into account, as a response to said enquiry the access point makes a preliminary reservation of the amount of data transmission capacity that is needed for the transmission of said data transmission connection through said access point.

5. A method according to claim 4, characterised in that after said switch has decided that said data transmission connection will not be transmitted through said access point, said switch sends said access point a release command in order to release the data transmission capacity which was preliminarily reserved.

6. A method according to claim 5, characterised in that said release command means that said preliminarily reserved data transmission capacity is completely released.

7. A method according to claim 5, characterised in that said release command means that said preliminarily reserved data transmission capacity is released partly, so that the part of said data transmission capacity that is not released is preliminarily reserved for the purpose that said data transmission connection is later handed over to said access point.

8. A method according to claim 1, characterised in that when said switch has decided that said data transmission connection will be transmitted through a given access point, the switch sends said access point a command to transmit said data transmission connection, and as a response to said command said access point forms, in order to control the resources reserved by said data transmission connection, a traffic protocol where a given share of the uplink radio resources is reserved for said data transmission connection.

9. A method according to claim 8, characterised in that the share of said uplink radio resources is a defined slot repeated in cycles.

10. A method according to claim 8, characterised in that as a response to said command, said access point also defines a given rate of error correction coding and a given retransmission protocol for the radio connection in between said access point and said mobile terminal in order to maintain the quality of service attached to said data transmission connection.

11. A method according to claim 10, characterised in that said access point defines a given constant rate of error correction coding and a given constant retransmission protocol to be applied throughout the radio connection between said access point and said mobile terminal.

12. A method according to claim 10, characterised in that said access point defines a given preliminary rate of error correction coding and a given preliminary retransmission protocol to be applied in the radio connection between said access point and said mobile terminal, and that it later redefines at least one of these.

13. The use of the method according to claim 1 during handover.

* * * * *